(No Model.)

A. R. HAMILTON.
AXLE BEARING.

No. 447,513. Patented Mar. 3, 1891.

ATTEST.
Helen Graham
W. W. Graham

INVENTOR
A. R. Hamilton
By L. P. Graham
his attorney.

UNITED STATES PATENT OFFICE.

ALEXANDER R. HAMILTON, OF DECATUR, ASSIGNOR, BY DIRECT AND MESNE ASSIGNMENTS, TO WILLIAM D. BARNETT AND G. L. LUKENS, BOTH OF CLINTON, ILLINOIS.

AXLE-BEARING.

SPECIFICATION forming part of Letters Patent No. 447,513, dated March 3, 1891.

Application filed April 22, 1890. Serial No. 348,989. (No model.)

*To all whom it may concern:*

Be it known that I, ALEXANDER R. HAMILTON, of Decatur, in the county of Macon and State of Illinois, have invented certain new and useful Improvements in Axle and Hub for Vehicle-Wheels, of which the following is a specification.

This invention consists in certain details of construction and combinations of parts, as hereinafter set forth and claimed, the objects being to exclude grit from the spindle, to retain oil, and to provide a superior boxing in the particulars hereinafter specified.

Figure 1:
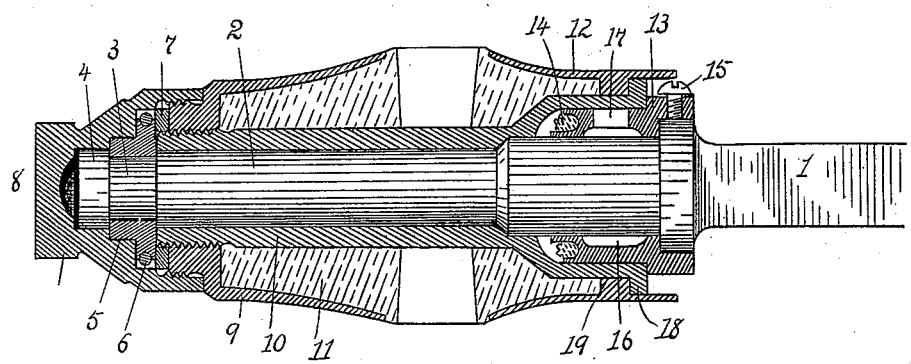
Figure 2:
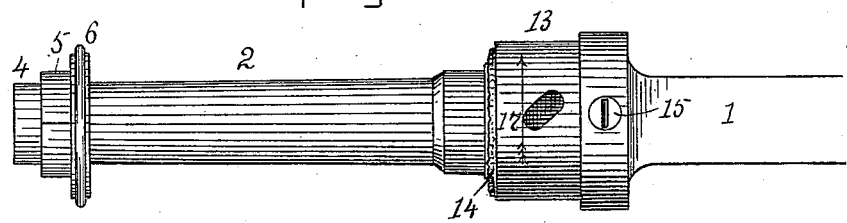
Figure 3:
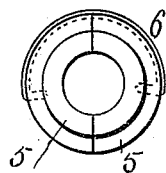

In the drawings accompanying and forming a part of this specification, Figure 1 is a central longitudinal section through a hub constructed in accordance with my invention. Fig. 2 is a representation of the spindle, the grit-trap, and the securing-clamp; and Fig. 3 is an end view of the securing-clamp.

The axle 1 is of customary or any desired construction. The spindle 2 has the circumferential recess 3 and the shoulder 4, the one receiving the clamp 5 and the other retaining it. The clamp 5 is in two parts, which are held yieldingly together by the spring-band 6. A packing-ring is shown at 7. The cap 8 screws onto the hub and holds the clamp in position on the spindle. The hub comprises the sleeve 10, adapted to the spindle and having the annular shoulder 18, the ferrule 12, having the internal ledge 19, that bears against the shoulder 18, the ferrule 9, screwed onto the outer end of the sleeve, and the spoke-holding wooden portion 11, which is clamped between the ferrules. The washer 7 bears against the end of ferrule 9 and the cap 8 is screwed onto the same.

The grit-trap consists of the collar 13, detachably secured to the spindle by means of set-screws 15 or other equivalent means. It is hollow, as indicated at 16, it has the opening or openings 17 in its upper surface, and it has oil-absorbing material in a groove at 14.

The direction of the rotation of the hub on the spindle is shown by the arrow in Fig. 2, and the slot 17 lies diagonal with relation to such motion and in position to tend to work the grit out of the hub. The grit caught by the trap is held effectually in the lower portion of the concavity, and it may be removed at any time by detaching the collar from the spindle.

The detachable collar is of service apart from its grit-trapping peculiarity, as it enables a worn collar to be replaced with a new one, and thus greatly increases the wearing capabilities of the spindle.

The absorbent material 14 helps to maintain a supply of oil. The cap 8 may be filled with oil and screwed into place, and it effectually precludes the escape of oil and renders frequent oiling unnecessary. The cap rotates with the hub, thereby lessening friction. There can be no stripping of threads from the spindle, and the connection of the hub with the spindle is stable, neat-appearing, and easily made.

The clamp 5 holds the hub on the spindle, and the cap 8 holds the clamp in place, while completely excluding dust, grit, &c.

I claim—

In combination with a spindle and hub, the detachable collar 13, having the internal annular recess 16 and openings in its upper surface only, as set forth.

In testimony whereof I sign my name in the presence of two subscribing witnesses.

ALEXANDER R. HAMILTON.

Attest:
I. D. WALKER,
L. P. GRAHAM.